Patented Nov. 4, 1952

2,616,921

UNITED STATES PATENT OFFICE 2,616,921

POLYALKYLENE GLYCOL ESTERS OF NITRATED ALKYLBENZOIC ACIDS AND PROCESS FOR THEIR PREPARATION

Carl B. Linn, Riverside, Ill., assignor to Universal Oil Products Company, Chicago, Ill., a corporation of Delaware No Drawing. Application November 30, 1950, Serial No. 198,464

11 Claims. (Cl. 260—471)

This invention relates to polyalkylene glycol esters of nitrated alkylbenzoic acids and particularly to polyethylene glycol esters of nitrated alkylbenzoic acids in which the alkyl group contains from about 6 to about 18 carbon atoms.

An object of this invention is to produce a polyalkylene glycol ester of a nitrated alkylbenzoic acid in which the alkyl group contains from about 6 to about 18 carbon atoms.

Another object of this invention is to produce a polyethylene glycol ester of a nitrated dodecylbenzoic acid.

One embodiment of this invention relates to a process which comprises reacting a polyalkylene glycol with a nitroalkylbenzoic acid in which the alkyl group contains from about 6 to about 18 carbon atoms, and recovering the resultant polyalkylene glycol ester of a nitroalkylbenzoic acid.

Another embodiment of this invention relates to a process which comprises reacting a polyethylene glycol and a nitrated alkylbenzoic acid in which the alkyl group contains from about 6 to about 18 carbon atoms, and recovering the resultant polyethylene glycol ester of a nitrated alkylbenzoic acid.

A further embodiment of this invention relates to a process which comprises reacting a long chain alkyltoluene with an aqueous solution of nitric acid at a temperature sufficient to convert the methyl group into a carboxylic acid group and to form a carboxynitroalkylbenzene, reacting said carboxynitroalkylbenzene with a polyalkylene glycol at an elevated temperature, and recovering the resultant polyalkylene glycol ester of a nitrated alkylbenzoic acid.

An additional embodiment of this invention relates to a process which comprises reacting an alkyltoluene in which the alkyl group contains from about 6 to about 18 carbon atoms with an aqueous solution of nitric acid at an oxidation and nitration temperature to form a carboxynitroalkylbenzene, reacting said carboxynitroalkylbenzene and a polyethylene glycol to form a polyethylene glycol ester of a nitrated alkylbenzoic acid.

I have found that a long-chain alkyltoluene in which the alkyl group contains from about 6 to about 18 carbon atoms and has no replaceable hydrogen atoms bound to the carbon atom which is combined with the benzene ring, is difficult to oxidize to an aromatic carboxylic acid. Thus an alkyltoluene which is represented by the formula:

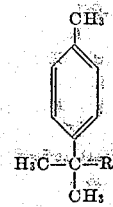

in which R represents an alkyl group containing from about 3 to about 15 carbon atoms, is not oxidized readily by an aqueous solution of chromic acid or an aqueous alkaline potassium permanganate solution. However, such an alkyltoluene does react rapidly with a heated aqueous solution of nitric acid such as a boiling 30% nitric acid solution, and the dodecyltoluene is converted readily into an acid-functioning product completely soluble in alkali. Elementary analysis and titration of this reaction product gave results showing it to have the formula of a carboxynitrododecylbenzene.

This oxidation and nitration treatment of an alkyltoluene, in which the alkyl group contains from about 6 to about 18 carbon atoms, is carried out at a temperature of from about 50° to about 150° C. and preferably at a temperature of from about 80° to about 120° C. and at atmospheric pressure or at a higher pressure which is sufficient to keep the reaction mixture in substantially liquid phase. The aqueous nitric acid solution used in this process generally contains from about 1 to about 50% by weight of HNO₃ and preferably from about 10 to 30% by weight of HNO₃.

The carboxynitroalkylbenzenes which are formed by this process may be of two types. In one of these the aromatic nucleus is nitrated and in the other the aliphatic side chain is nitrated. There is evidence for the presence of both types in the reaction product. Such nitro compounds can be hydrogenated mildly to give the corresponding amino analogues which have utility as detergents and as intermediates in chemical syntheses such as in the production of a polyalkylene glycol ester of an aminoalkylbenzoic acid, the latter compound also being referred to herein as a carboxyaminoalkylbenzene. In producing the ester of nitroalkylbenzoic acid, a mixture of nitroalkylbenzoic acids, or an aminoalkylbenzoic acid of the types referred to herein may be heated with a polyalkylene glycol such as polyethylene glycol at a temperature of from about 75° to about 200° C. and preferably at a temperature of from about 125° to about 175° C. This esterification treatment may be carried out using either batch or continuous types of operation in order to produce the desired polyalkylene glycol ester of a nitroalkylbenzoic acid or aminoalkylbenzoic acid which is useful as a wetting agent and detergent, particularly for the cleansing of cotton cloth.

The treatment of a long-chain alkyltoluene with nitric acid according to this invention may be carried out in either batch or continuous types of operation. In a typical batch-type operation the alkyltoluene and aqueous solution of nitric acid containing from about 1 to about 50% by weight of $HNO_3$ are mixed in a suitable reactor provided with a mechanically driven stirrer or with other suitable mixing equipment and the resultant mixture is maintained at a temperature of from about 50° to about 150° C., either at atmospheric pressure or at a higher pressure for a time sufficient to oxidize the methyl group of an alkyltoluene and to cause nitration that is, mononitration of the benzene ring, or of the side chain. The time needed for this oxidation and nitration treatment is dependent upon the temperature and also upon the nitric acid concentration employed. It was found that the reaction was complete in less than 20 hours when employing an aqueous solution containing 30% by weight of $HNO_3$.

An oxidation-nitration treatment of a long-chain alkyltoluene is also carried out by passing this hydrocarbon and an aqueous solution of nitric acid containing from about 1 to about 50% of $HNO_3$ through a tubular reactor provided with baffles or other adequate mixing means and maintained at a temperature of from about 50° to about 150° C. The time of treatment is controlled by the volume of the reactor and by the rates at which the alkyltoluene and aqueous nitric acid solution are passed therethrough. These factors are controlled so that oxidation of the methyl group to a carboxylic acid group is substantially complete and also so that nitration of the benzene ring occurs to produce a carboxymononitroalkylbenzene. The mixture of reaction products is discharged from the tubular reactor and then subjected to suitable separation means in order to recover the carboxynitroalkybenzene.

The esterification of the nitroalkylbenzoic acids which are formed as indicated above may be carried out by reacting the mentioned organic acid with a polyhydric alcohol such as a polyalkylene glycol and preferably a polyethylene glycol at an elevated temperature and in the presence or absence of an added acid-acting catalyst such as sulfuric acid, phosphoric acid and the like. Polyethylene glycol esters of nitroalkylbenzoic acids and amino-alkylbenzoic acids are also produced by heating said benzoic acids with the weight of ethylene glycol calculated to give the ester group of the molecular weight desired.

The nature of this invention and results obtained thereby are illustrated in the following examples which should not be construed to limit unduly the generally broad scope of the invention.

Example I

A 500 cc. flask provided with a water cooled reflux condenser was charged with:

100 cc. conc. (70%) nitric acid,
200 cc. water,
30 cc. (26 g.) dodecyltoluene.

This mixture was heated at reflux temperature (109° C.) for four days. After cooling, the aqueous acid was decanted from the oil phase which was heavier than pure water. This product was shaken three times with near-boiling water, and found to weigh 29 grams. When treated with warm caustic solution apparently all went into solution (but later results indicated that the resulting soap solution peptized some residual neutral material). The free acid was precipitated by acidifying the caustic solution with hydrochloric acid. This was a heavy yellow oil which dissolved in caustic to give a red solution. Analysis of the heavy yellow oil which was soluble in caustic showed this material to have the composition and properties expected for nitrododecylbenzoic acid.

The nitrododecylbenzoic acid formed as indicated above was reacted with polyethylene glycol as follows. A 250 cc. flask was charged with 21.6 grams of polyethylene glycol (600 molecular weight), 19 grams of the organic acid produced by treating dodecyltoluene with nitric acid, and 2 drops of sulfuric acid and the resultant mixture was heated on a steam bath in a current of carbon dioxide for a time of 19 hours. Examination of the resultant product showed that small amounts of esterification had occurred.

Example II

A glass liner for a steel autoclave of 850 cc. capacity was charged with:

| | Grams |
|---|---|
| Polyethylene glycol (1000 m.wt.) | 40 |
| Acid from dodecyltoluene | 14 |
| p-Toluene sulfonic acid | 0.3 |

The liner was placed in the autoclave and several grams of freshly cut sodium added outside the glass to act in a dehydrating capacity. The autoclave was sealed, evacuated and heated to 140° C. The absolute pressure on the autoclave was 12 pounds and the warm autoclave was then evacuated. The autoclave was maintained at 150° ±3° C. for 24 hours.

The product removed from the liner was a brown wax, completely water soluble and an effective detergent for loosening grease, soil, etc.

I claim as my invention:

1. A process which comprises reacting a polyalkylene glycol with a mononitrated alkylbenzoic acid in which the alkyl group contains from about 6 to about 18 carbon atoms, and recovering the resultant polyalkylene glycol ester of said acid.

2. A process which comprises reacting a polyethylene glycol and a mononitrated alkylbenzoic acid in which the alkyl group contains from about 6 to about 18 carbon atoms, and recovering the resultant polyethylene glycol ester of a nitrated alkylbenzoic acid.

3. A process which comprises reacting a long-chain alkyltoluene with an aqueous solution of nitric acid at a temperature sufficient to convert the methyl group into a carboxylic acid group and to form a carboxymononitroalkylbenzene, reacting the last-named compound with a polyalkylene glycol at an elevated temperature, and recovering the resultant polyalkylene glycol ester of a nitrated alkylbenzoic acid.

4. A process which comprises reacting an alkyltoluene in which the alkyl group contains from about 6 to about 18 carbon atoms with an aqueous solution of nitric acid at an oxidation and nitration temperature to form a carboxymononitroalkylbenzene, reacting the last-named compound and a polyethylene glycol to form a polyethylene glycol ester of a nitrated alkylbenzoic acid, and recovering said ester.

5. A process which comprises reacting an alkyltoluene in which the alkyl group contains from about 6 to about 18 carbon atoms with an aqueous solution of nitric acid at a temperature of from about 50° to about 150° C. to form a carboxymononitroalkylbenzene, reacting the last-named compound with a polyalkylene glycol to form a polyalkylene glycol ester of a nitrated alkylbenzoic acid, and recovering said ester.

6. A process which comprises reacting an alkyltoluene in which the alkyl group contains from about 6 to about 18 carbon atoms with an aqueous solution of nitric acid at a temperature of from about 50° to about 150° C. to form a carboxymononitroalkylbenzene, reacting the last-named compound with a polyalkylene glycol at a temperature of from about 75° to about 200° C. to form a polyalkylene glycol ester of a nitrated alkylbenzoic acid, and recovering said ester.

7. A process for producing a surface-active material which comprises reacting an alkyltoluene in which the alkyl group contains from about 6 to about 18 carbon atoms with an aqueous solution containing from about 1 to about 50% by weight of $HNO_3$ at a temperature of from about 50° to about 150° C. to form a carboxymononitroalkylbenzene, reacting the last-named compound with a polyalkylene glycol at a temperature of from about 75° to about 200° C., and recovering the resultant polyalkylene glycol ester.

8. A process for producing a surface-active material which comprises reacting dodecyltoluene with an aqueous solution containing from about 1 to about 50% by weight of $HNO_3$ at a temperature of from about 50° to about 150° C. to form a carboxymononitrododecylbenzene, reacting the last-named compound with a polyalkylene glycol at a temperature of from about 75° to about 200° C., and recovering the resultant polyalkylene glycol ester.

9. A polyalkylene glycol ester of a mononitroalkylbenzoic acid in which the alkyl group contains from about 6 to about 18 carbon atoms.

10. A polyethylene glycol ester of a mononitrododecylbenzoic acid.

11. A polyethylene glycol ester of a mononitroalkylbenzoic acid in which the alkyl group contains from about 6 to about 18 carbon atoms.

CARL B. LINN.

No references cited.